Patented Nov. 30, 1943

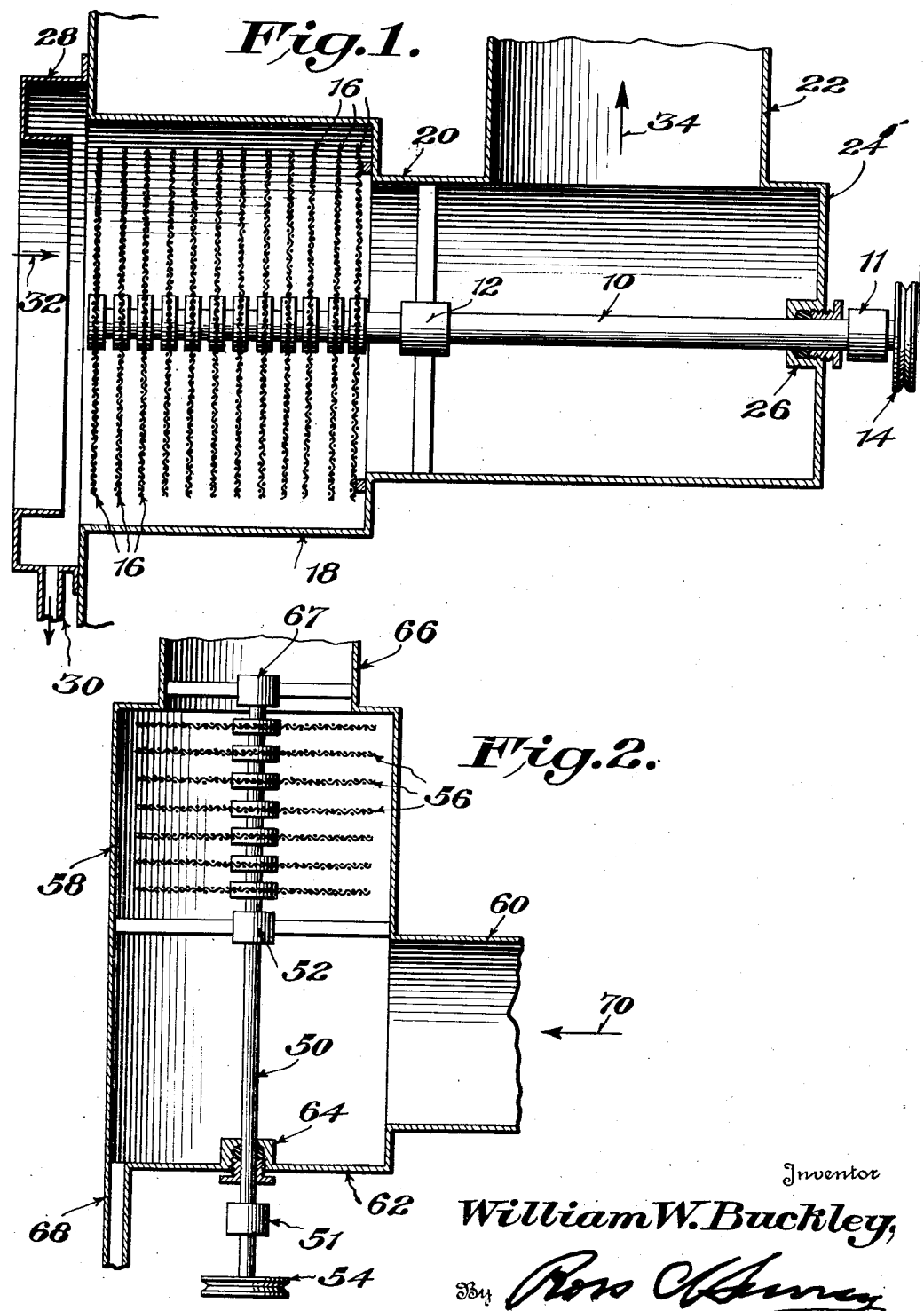

2,335,641

UNITED STATES PATENT OFFICE 2,335,641

FOAM ELIMINATOR

William W. Buckley, Moss Point, Miss.

Application August 11, 1941, Serial No. 406,435

9 Claims. (Cl. 252—361)

It is an object of my invention to provide a foam eliminator which will have a minimum number of working parts, will require very little power to operate, and which will require a minimum of variation in the design of the parts to accommodate any and all operating conditions.

In many industries there are encountered liquids which are inherently susceptible to formation of foam and the treatment of which frequently causes the formation of foam. When foaming occurs, the volume of a given weight of liquid is enormously multiplied and since the apparatus handling the liquid will usually be designed to handle volumes based on the normal density of the liquid, foaming will cause an overflow with the result that valuable chemicals may be lost and various operating stations may be over-run.

This invention is not restricted to any particular industry but has utility wherever foaming is apt to occur.

One of the most important features of this invention lies in the fact that it is operative in any position and, no matter what the position of the device, it may be fed from either end. A device of this sort adapted to take care of unusual emergency conditions represents necessarily a dependent design and must be fitted into whatever space conditions result from the placing and operation of the major equipment elements. The layout of these major elements and the space left for the installation of the foam eliminator will determine, for example, whether the eliminator is to have a horizontal, a vertical, or an inclined axis, and will determine from what direction the foam will come and will also determine the direction in which the entrapped gases and the residual liquor shall be fed after they are separated.

The basis of the universal positional applicability of my invention lies in the provision of complete, 360° enclosure of the rotating element, and in the adjustment of the passages so that the flow of foam is always regulated by a back pressure created by the rotation of the rotating element.

Naturally, no single size and design will be optimum for all foams. For example, one would not expect the same device to be equally effective at destroying foam coming from the black liquor evaporators in a kraft pulp mill and foam coming from beer in a brewery. My foam eliminator, however, if designed for a particular foam, may operate with its axis in any position, and may be fed and relieved from any combination of directions.

The above and other objects will be made clear from the following detailed description taken in connection with the annexed drawing in which:

Figure 1 shows one form of my foam eliminator arranged on a horizontal axis; and Fig. 2 shows another form of my foam eliminator on a vertical axis.

Referring now to Fig. 1, I provide a shaft 10 mounted in an outer bearing 11 and an inner bearing 12 and having a pulley 14 at its free end. Mounted at its opposite end is a series of foraminous members 16. The foraminous members 16 may be formed of wire mesh, or perforated sheet metal or even may comprise radial wires. Their only necessary qualifications are that the material from which the members are formed be not chemically reactive to the foam handled and that the members shall have sufficient mechanical strength and rigidity for their purpose. A wide range of materials will meet these requirements.

The members 16 are secured to and rotate with the shaft 10. A housing 18 completely surrounds the members 16. The housing 18, just beyond the members 16, has a reduced portion 20 of a diameter less than that of the members 16. On the upper side of the reduced portion 20 is an outlet opening 22. The rear end of the reduced portion 20 is closed by a wall 24 which is penetrated by the shaft 10 through a stuffing box 26.

At the front end of the housing 18 is a launder 28 having a vent 30 for a purpose which will presently be described.

The operation of the device is as follows:

Foam enters the device in the direction of the arrow 32. The members 16 are rotating rapidly and as the foam comes in contact with the foraminous members the bubbles are ruptured releasing the entrapped gases. The liquid, after separation from the gases, is flung, by centrifugal force, upon the walls of the housing 18. Ultimately the liquid collects at the bottom of the housing 18 and drains into the launder 28 where it is removed through the vent 30.

The released gases easily pass through the foraminous members 16 into the reduced portion 20 of the housing 18 and are removed through the outlet 22 in the direction of the arrow 34.

By providing the reduced portion 20 just behind the members 16, I enable the rotation of the members 16 to set up a slight pumping action and thus to create sufficient back pressure in the space between the members 16 and the housing 18 to prevent the passage of unbroken foam therethrough.

For horizontal operation, the arrangement shown in Fig. 1 is preferred, since it leaves the inner bearing 12 out of reach of the possibly gummy liquid contained in the foam. Clearly, however, the shaft could extend in the opposite direction, in which case the foam inlet would be fully housed, and a sealed inner bearing could be used if desired.

The form shown in Fig. 2 illustrates a vertical axis installation. Here I provide a shaft 50 mounted in an outer bearing 51 and an inner bearing 52 and having a pulley 54 at its free end. At the opposite end of the shaft 50 is mounted a series of foraminous members 56. The members 56 are precisely similar to the members 16 discussed in connection with Fig. 1. A casing 58 surrounds the members 56 and the shaft 50. The casing 58 has a foam inlet 60 and a closure 62 which is penetrated by the shaft 50 through a stuffing box 64.

At the outlet end, the casing 58 has a reduced portion 66 of a diameter less than that of the foraminous members 56. Optionally, a bearing 67 may be provided in the reduced portion 66 and if so provided, the inner bearing 52 may be eliminated.

A vent 68 is provided in the closure 62 of the housing 58 for a purpose to be described.

The device shown in Fig. 2 functions in the precise manner of that shown in Fig. 1. Foam enters through the inlet 60 in the direction of the arrow 70. The foam rises to encounter the rapidly rotating members 56. These break the bubbles of foam and, by centrifugal force, throw the deaerated liquid against the walls of the casing 58. The liquid drains down the walls and is removed through the vent 68. The released gases pass through the foraminous members 56 and out through the reduced portion 66. The reduced portion cooperates with the rotating members 56 to create a back pressure, as previously discussed in connection with Fig. 1.

It is clear that the pulley could be placed at the top instead of at the bottom of the form of Fig. 2. This would be desirable as eliminating contact between the foam and the inner bearing.

While I have shown one vertical and one horizontal form of my device, the axis may be inclined at any intermediate angle, depending on the exigencies of the particular installation, and, as heretofore pointed out, any desired driving means may be used and the drive may be from either end. The only essential is that the released gas must be allowed to pass away from the foam, and an upward movement of the gas, being most natural, is preferable.

The number, spacing, size and characteristics of the discs, and their speed of rotation all depend on the job to be done and I do not limit my claims to the number, kind and proportions shown. The minimum speed of rotation should be great enough to produce the back pressure above mentioned and to assure centrifugal action on the liquid. The maximum speed, however, may be as high as desired.

What is claimed is:

1. A foam eliminator comprising a foraminous member; and a casing spaced from and surrounding the entire periphery of said member, and means for rotating said member at a speed sufficient to dislodge fluids therefrom by centripetal force a foam inlet at one end of said casing and an outlet for released gas at the other end of said casing, said foraminous member lying intermediate said inlet and outlet whereby to avoid penetration of the oncoming foam by said released gases and an outlet for released liquid on the same side of said member as said foam inlet.

2. A foam eliminator comprising a foraminous member mounted for rotation; and a casing spaced from and surrounding the entire periphery of said member, said casing being constricted to less than the diameter of said foraminous member on the outlet side, said member and said casing being so proportioned and arranged that the rotation of said member will create a back pressure between the periphery of said member and said casing a foam inlet at one end of said casing and an outlet for released gas at the other end of said casing, said foraminous member lying intermediate said inlet and outlet whereby to avoid penetration of the oncoming foam by said released gases and an outlet for released liquid on the same side of said member as said foam inlet.

3. A foam eliminator comprising a foraminous member mounted for rotation; and a casing spaced from and surrounding the entire periphery of said member, said casing being constricted to less than the diameter of said foraminous member on the outlet side, means for rotating said member at a speed sufficient to dislodge fluids therefrom by centripetal force, said member and said casing being so proportioned and arranged that the rotation of said member at such speed will create a back pressure between the periphery of said member and said casing a foam inlet at one end of said casing and an outlet for released gas at the other end of said casing, said foraminous member lying intermediate said inlet and outlet whereby to avoid penetration of the oncoming foam by said released gases and an outlet for released liquid on the same side of said member as said foam inlet.

4. A foam eliminator comprising a coaxial series of spaced, foraminous members; means for rotating said members; and a casing spaced from and surrounding the entire periphery of said members, a foam inlet at one end of said casing and an outlet for released gas at the other end of said casing, said foraminous members lying intermediate said inlet and outlet whereby to avoid penetration of the oncoming foam by said released gases and an outlet for released liquid on the same side of said member as said foam inlet.

5. A foam eliminator comprising a coaxial series of spaced, foraminous members; and a casing spaced from and surrounding the entire periphery of said members, and means for rotating said members at a speed sufficient to dislodge fluids therefrom by centripetal force a foam inlet at one end of said casing and an outlet for released gas at the other end of said casing, said foraminous members lying intermediate said inlet and outlet whereby to avoid penetration of the oncoming foam by said released gases and an outlet for released liquid on the same side of said member as said foam inlet.

6. A foam eliminator comprising a coaxial series of spaced, foraminous members; means for rotating said members; and a casing spaced from and surrounding the entire periphery of said members, said casing being constricted to less than the diameter of said members on the outlet side, said members and said casing being so proportioned and arranged that the rotation of said members will create a back pressure between the periphery of said members and said casing a foam inlet at one end of said casing and an outlet for released gas at the other end of said casing, said foraminous members lying intermediate said inlet and outlet whereby to avoid penetration of the oncoming foam by said released gases and an outlet for released liquid on the same side of said member as said foam inlet.

7. A foam eliminator comprising a coaxial series of spaced, foraminous members; and a casing spaced from and surrounding the entire periphery of said members, said casing being constricted to less than the diameter of said members on the outlet side, and means for rotating said members at a speed sufficient to dislodge fluids therefrom by centripetal force, said members and said casing being so proportioned and arranged that the rotation of said members at such speed will create a back pressure between the periphery of said members and said casing a foam inlet at one end of said casing and an outlet for released gas at the other end of said casing, said foraminous members lying intermediate said inlet and outlet whereby to avoid penetration of the oncoming foam by said released gases and an outlet for released liquid on the same side of said member as said foam inlet.

8. A method of reclaiming the constituents of foam comprising: advancing a mass of foam along a conduit; creating, in the path of said foam, a penetrable zone of mechanical force transverse the conduit; causing said foam to penetrate said zone of force; utilizing the impact of said force to separate the gaseous and liquid constituents of said foam and to deliver the liquid to the walls of said conduit; removing said liquid constituent by drainage along the walls of said conduit, and removing the released gaseous constituent through said zone in the same direction as the advance of said foam.

9. A method of reclaiming the liquid constituent of foam comprising: advancing a mass of foam along a conduit; creating, in the path of said foam, a penetrable zone of mechanical force transverse the conduit; causing said foam to penetrate said zone of force; utilizing the impact of said force to separate the gaseous and liquid constituents of said foam and to deliver said liquid constituent to the walls of said conduit; controlling the size and intensity of said zone relative to the form and proportions of said conduit to create a pressure in said conduit in a direction opposite to that of the advance of said foam; utilizing said pressure to prevent foam from by-passing said zone; removing said liquid constituent by drainage along the walls of said conduit, and removing the released gaseous constituent through said zone in the same direction as the advance of said foam.

WILLIAM W. BUCKLEY.